(12) United States Patent
Merritt

(10) Patent No.: US 6,439,092 B1
(45) Date of Patent: Aug. 27, 2002

(54) DEVICE FOR PROCESSING A STRAND OF PLASTIC MATERIAL

(76) Inventor: Mark W. Merritt, Mahler-Lochbihler-Strasse, Kempten D-87435 (DE)

(*) Notice: Subject to any disclaimer, the term of this patent is extended or adjusted under 35 U.S.C. 154(b) by 0 days.

(21) Appl. No.: 09/117,552
(22) PCT Filed: Jan. 28, 1997
(86) PCT No.: PCT/EP97/00365
§ 371 (c)(1),
(2), (4) Date: Apr. 12, 1999
(87) PCT Pub. No.: WO97/27979
PCT Pub. Date: Aug. 7, 1997

(30) Foreign Application Priority Data

| Feb. 2, 1996 | (DE) | ................................. 196 03 659 |
| Apr. 9, 1996 | (DE) | ................................. 196 14 070 |
| Jun. 24, 1996 | (DE) | ................................. 196 24 957 |

(51) Int. Cl.$^7$ .................................................. B26D 5/08
(52) U.S. Cl. ........................... 83/599; 83/602; 83/54
(58) Field of Search .................... 83/598, 602, 950, 83/599, 54, 620; 29/33 M, 566.1, 566.2, 566.3, 564.6, 564.8, 747, 749, 751, 857, 866, 867, 861

(56) References Cited

U.S. PATENT DOCUMENTS

| 3,877,626 A | | 4/1975 | Hackermann et al. |
| 4,011,780 A | * | 3/1977 | David ........................ 83/598 |
| 4,230,010 A | * | 10/1980 | Guenthner .................. 83/602 |
| 4,398,881 A | | 8/1983 | Kobayashi |
| 4,449,435 A | * | 5/1984 | Colditz ........................ 83/598 |
| 4,608,755 A | | 9/1986 | Braasch |
| 4,646,404 A | * | 3/1987 | Matsui ..................... 29/33 M |
| 5,074,038 A | * | 12/1991 | Fath .......................... 29/861 |

FOREIGN PATENT DOCUMENTS

| DE | 168501 | 3/1904 |
| DE | 1109137 | 4/1968 |
| DE | 3434671 | 5/1985 |
| EP | 0360446 B1 | 3/1993 |

* cited by examiner

Primary Examiner—Rick Chang
(74) Attorney, Agent, or Firm—Collard & Roe, P.C.

(57) ABSTRACT

Apparatus (1) for the constriction and possible severance of a strip (2) of plastic material—particularly a multilayer extruded strip—at specified intervals, with a tool (3, 4) that consists of a plurality of segments (35 to 40) which can be moved against each other, where this tool (3, 4) is made up of two sections (31, 32) which can be separated from each other and each of which contains some of the segments (35 to 40), as well as for the possible simultaneous closure of a casing.

27 Claims, 19 Drawing Sheets

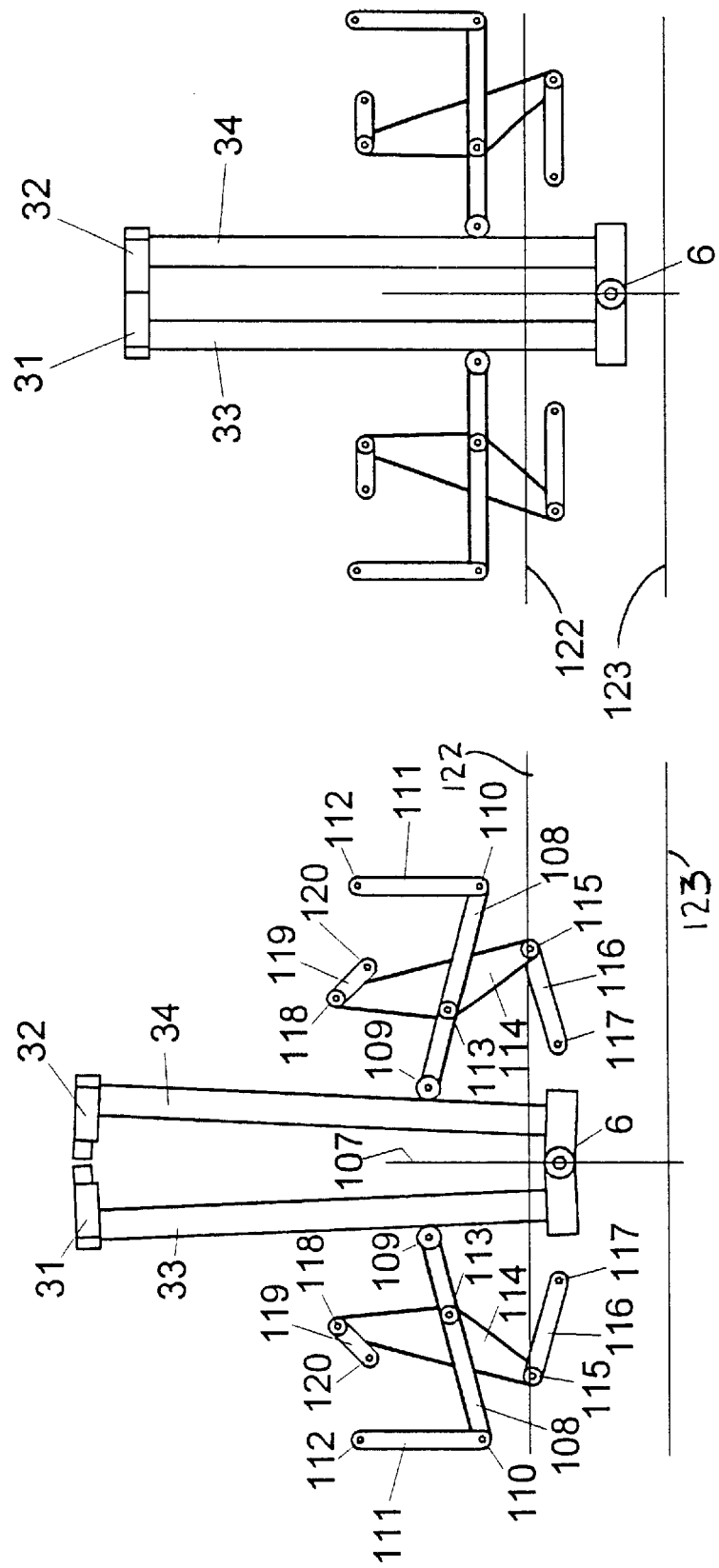

DEVICE FOR PROCESSING A STRAND OF PLASTIC MATERIAL

Figure 1:
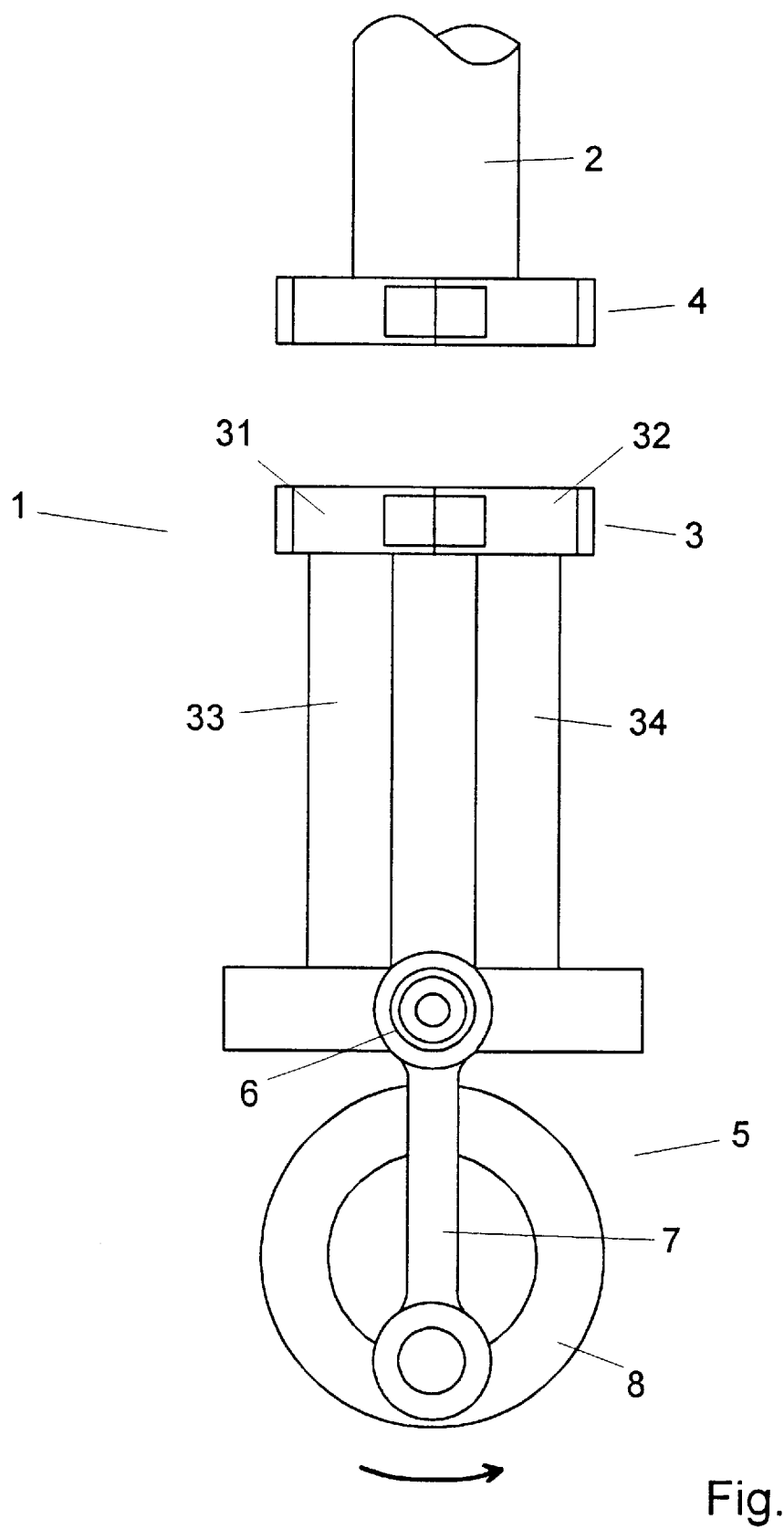

The invention relates to an apparatus for the processing, the possible constriction and possible severance of a strip of plastic material—particularly a multilayer extruded strip—at specified intervals, with a tool that consists of a plurality of segments that can be moved against each other, as well as the possible simultaneous closure of a casing.

BACKGROUND OF THE INVENTION

An apparatus of this kind that is used to sever hot plastics pipes is, for example, disclosed in GB-PS 1 109 137.

A similar apparatus for cutting strips of dough to length is shown and described in EP 0 360 446 B.

Although both of these apparatuses are suitable for severing sections of a strip into specified lengths, their design makes them very inflexible.

SUMMARY OF THE INVENTION

The purpose of the invention is to create an apparatus of the kind outlined above that can be used flexibly and therefore effectively.

In the solution to this problem proposed by the invention, the tool consists of two sections which can be separated from each other and each of which contains some of the segments.

Since the tool can be separated in the course of the operation, it can be opened further than its segment structure would normally allow, so that it can be deployed for a wide range of different applications.

It is very favourable in this context if in accordance with a further development of the invention two dividable tools are located above each other.

Since the two tools can be divided, they can be opened far enough to permit them to move past each other.

It has proved to be particularly advantageous in this context if in accordance with a further development of the invention the tools are arranged so that they can move vertically.

It is also very advantageous if in accordance with the invention the speed of tool movement can be coordinated with the speed at which the strip is transported.

This makes it possible to produce and transport the strip on a continuous basis, so that it does not have to be slowed down in order to be cut to length.

In a particularly advantageous further development of the invention, tool movement speed and distance and tool closing and opening speed can be coordinated with each other in the movement from the top point to the bottom point.

This means there is no danger that the strip or the severed sections will be affected by the tool, because the latter is already open again when it reaches its bottom point and changes direction and remains open at least to a large extent in accordance with the invention when it completes the movement from ist bottom point to its top point.

In an advantageous further development of the invention, the dividable tool is separated into two parts at least in a middle section of the path it travels from its bottom point to its top point.

It has also proved to be very advantageous if in accordance with the invention the segments of the tool rest against each other with at least one of their surfaces while a further surface is supported against sliding surfaces of a polygonal housing and if an actuating element engages at least one of the segments and is able to move this segment directly—and the other segments indirectly—into the closed position and preferably into the open position as well.

This arrangement makes it possible for a single actuating element to move all the segments at least from their open position to their closed position, as the movement of one segment automatically leads to the movement of the other segments by this one segment as well as by the sliding surfaces. If this actuating element is designed in the appropriate way as a combined pushing and pulling element, it can, however, be used to move the segments from the closed position to the open position too.

It is also very advantageous if in accordance with the invention a further actuating element engages one of the segments of the tool and is able to move this segment and thus indirectly the other segments into the open position.

This further actuating element can be used additionally to move the segments of the tool from their closed position to their open position.

In the case of an apparatus with a two-part housing, it is possible in accordance with the invention that an actuating element engages one segment in each of the two halves of the housing and is able to move the segments into their respective closed position and preferably their respective open position as well.

This makes it possible to initiate the movement operation of the segments while the two halves of the housing are still separated from each other.

It has proved to be very favourable in this context if in accordance with the invention a further actuating element engages one segment in each of the two halves of the housing which is able to move this segment and thus indirectly the other segments of this half of the housing into the open position.

If this further actuating element engages a segment that is located on the outside when the housing is open, it helps in addition to hold this segment in position.

It is also very advantageous if in accordance with a further development of the invention a toothed belt is used as actuating element to engage one of the segments.

The almost wear resistant operation of a toothed belt and its low elasticity is advantageous for operations at higher speed.

In an advantageous further development of the invention, the two halves of the housing are attached to moving support columns that are hollow and are provided inside with a drive unit for adjusting the segments.

It has also proved to be very favourable if in accordance with the invention a gatelike program device can be incorporated in the drive facilities for moving the segments, with the help of which the closing and opening movement of the segments is carried out in accordance with the lifting movement of the tool.

The opening and closing movements can be adapted to the specific requirements in each individual case simply by changing this gatelike program device.

It is also very advantageous if an apparatus for the application of closure elements for the constricted strip is provided in the area of the tool. In addition, an apparatus for the application of two closure elements can be provided, where a cutting device severs the constricted strip between the two applied closure elements.

The invention relates to an apparatus to drive a tool in a ring-shaped movement, where the tool is arranged on a lever arm, that is connected to a pivot bearing with its end opposing the tool.

Tools arranged in this way can easily carry a out ring-shaped movement towards the work piece to be processed and back again.

However, this is not sufficient for work pieces that are moved in longitudinal direction during processing. Therefore, in practical operation the work pieces are in most cases stopped during processing.

The purpose of the invention is to describe an apparatus of the mentioned kind which allows to move the work piece in longitudinal direction while the work piece is processed by the tool.

In the solution to this problem proposed by the invention, the pivot bearing allows longitudinal displacement and the lever arm is engaged by a drive unit which, at the the same time, turns the lever arm around the pivot bearing and moves the pivot bearing in longitudinal direction.

Since the slewing movement and the movement in longitudinal direction take place simultaneously, the tool carries out a ring-shaped movement. The tool moves towards the work piece and, at the same time, moves along with it. Then the tool slews away from the work piece and returns to its starting point.

In an advantageous further development of the invention the drive unit has an eccentric design.

Through different embodiments of the eccentricity it is possible to modify the closing movement and the longitudinal movement within wide boundaries.

It has also proved to be very advantageous if in accordance with a further development of the invention, the lever arm is engaged by a knee lever, the first arm of which is pivoted on a lever arm with one end and to a second arm with the other end. The opposing end of the second arm is connected to a stationary pivot, where the drive unit for the lever arm engages through the knee lever.

This way, an exact guidance of the lever arm and a simple initiation of the driving power is ensured.

In another advantageous further development of the invention, a two-armed lever is connected with a first pivot bearing to the first arm of the knee lever—the arm that is allocated to the lever arm—and has a second pivot bearing that is at least indirectly stationary pivoted and a third pivot bearing that is driven on a circular orbit.

This way, the drive movement is reduced to a circular movement that can be carried out easily.

Another advantageous further development of the invention is characterized in, that a lever arm is pivoted on the second pivot bearing and that the end of the lever arm opposing the second pivot bearing is stationary pivoted.

Since the length of the lever arm can be adjusted at will, another flexible feature is added to the drive unit.

It has also proved to be very advantageous if in accordance with another further development of the invention, a further lever arm is connected to the third pivot bearing, where this lever arm is connected to a stationary rotary drive with its end opposing the third pivot bearing.

This way, a particularly simple embodiment of the actual drive has been made possible.

It is also very advantageous if the first pivot bearing of the two-armed lever is provided between the two other pivot bearings.

In another advantageous further development of the invention, the application point of the knee lever on the lever arm is designed to allow length adjustments.

This way, the ratio between slewing movement and longitudinal movement can be modified in an easy way with otherwise constant drive unit.

It has also proved to be very advantageous if in accordance with a further development of the invention the stationary pivots are arranged adjustably.

With this too, it is possible to modify both moving directions to each other in an easy way.

In another advantageous further development of the invention, two tools are arranged specularily, the lever arms of which are conncted to a joint pivot bearing.

An embodiment of this kind has proved to be very advantageous, particularly in cases of work pieces that are supposed to be processed on both sides at the same time.

In this context, it is possible in accordance with a further development of the invention that both lever arms are mechanically synchronized by gearwheels and/or lever connections.

Another possibility in accordance with the invention is that a speculary drive unit is arranged on the second lever arm.

This way, it is also possible to control both tools synchronously or differentially.

In another advantageous further development of the invention, the knee levers respectively the lever components themselves are perforated disks.

Moreover, the invention relates to an apparatus for driving and/or guiding a two-piece tool, particularly an apparatus for the processing, the possible constriction and possible severance of a strip of plastic material—particularly a multi-layer extruded strip—at specified intervals, with a tool that consists of a plurality of segments that can be moved against each other, as well as the possible simultaneous closure of a casing.

The purpose of the invention is to create an apparatus of the kind outlined above that allows exact guidance and reliable drive of the tools with relatively simple means.

In the solution to the problem proposed by the invention, each part of the tool is driven and guided along a preset line.

This linear guidance allows an exact determination of the path of the tool parts and can be adapted to the respective requirements.

In an advantageous further development of the invention, the tool parts are arranged on two chainlike drives and/or guiding devices.

In practical operation. chainlike guiding devices have been approved in many fields; sufficiently guided themselves, they can easily be used for additional guiding work. It is furthermore possible to separate the driving and the guiding work at least in sections of the device.

In another advantageous further development of the invention, the drive and guiding devices are arranged parallel to each other and with small distance from each other on at least a section of their path, whereby the tool parts are in working position and interact with each other in this section of the path.

This way, the tool parts are given sufficient time to act on the material to be formed. In addition, this section of the path can be adjusted individually.

It has proved to be very advantageous if in a further development of the invention the two parallel running route sections are arranged vertically.

In this way, it is also possible for a vertically flowing strip from an extrusion die or something similar to be processed easily.

However, in accordance to a further development of the invention, it is also possible to arrange the two parallel running route sections in horizontal direction and to provide a conveyor or something the like for a strip of dough, where the conveyor also has a horizontal section and the speed of which can be adjusted to the speed of the tool parts.

This device is especially suitable for the processing of very delicate material since the undesirable stretching of dough material does not occur.

In another advantageous further development of the invention, the tool parts are connected to lever arms and move on a curve track, where the two curve tracks of the two tool parts overlap along a contact route of the corresponding tool parts and where the tool parts are connected to flexible bearings and are in working position within the contact route.

In an also very advantageous further development of the invention, the tool parts are provided with a drive unit that works with intermitting speeds during the circulation of the tool parts.

In another advantageous further development of the invention, a gatelike program device or something the like is provided at least within the working area of the tool parts to control the segments of the tool parts that can be moved against each other.

Particularly for operations at higher speeds it has proved to be very advantageous, if in accordance with another further development of the invention, both tool parts are connected to flexible bearings and are spring-loaded.

This way, a colliding of the tool parts with all its negative consequences for the entire mechanics is avoided effectively.

DETAILED DESCRIPTION OF THE DRAWINGS

Several embodiments of the invention are illustrated in the drawings.

Figure 10:
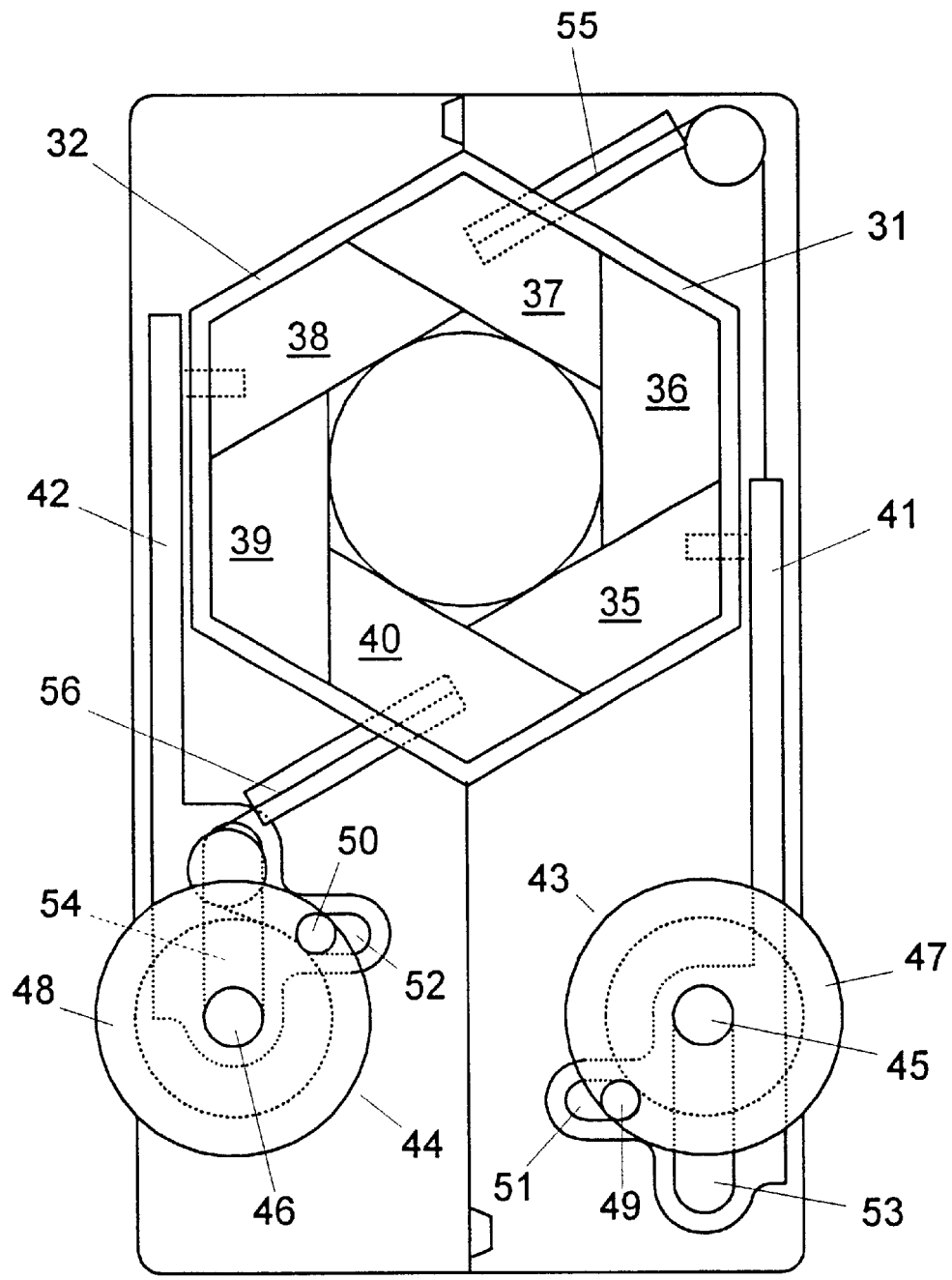
Figure 11:
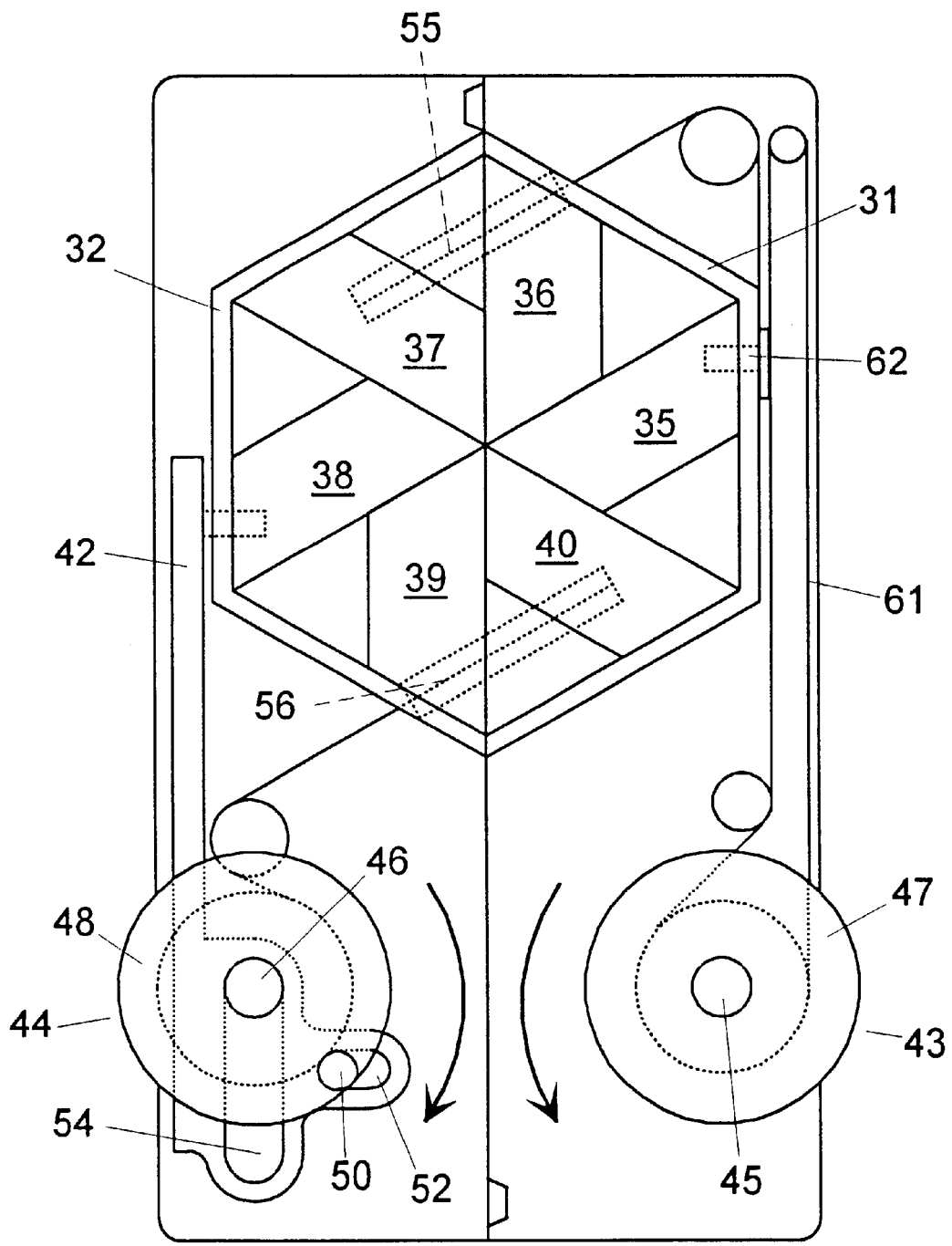
Figure 21:
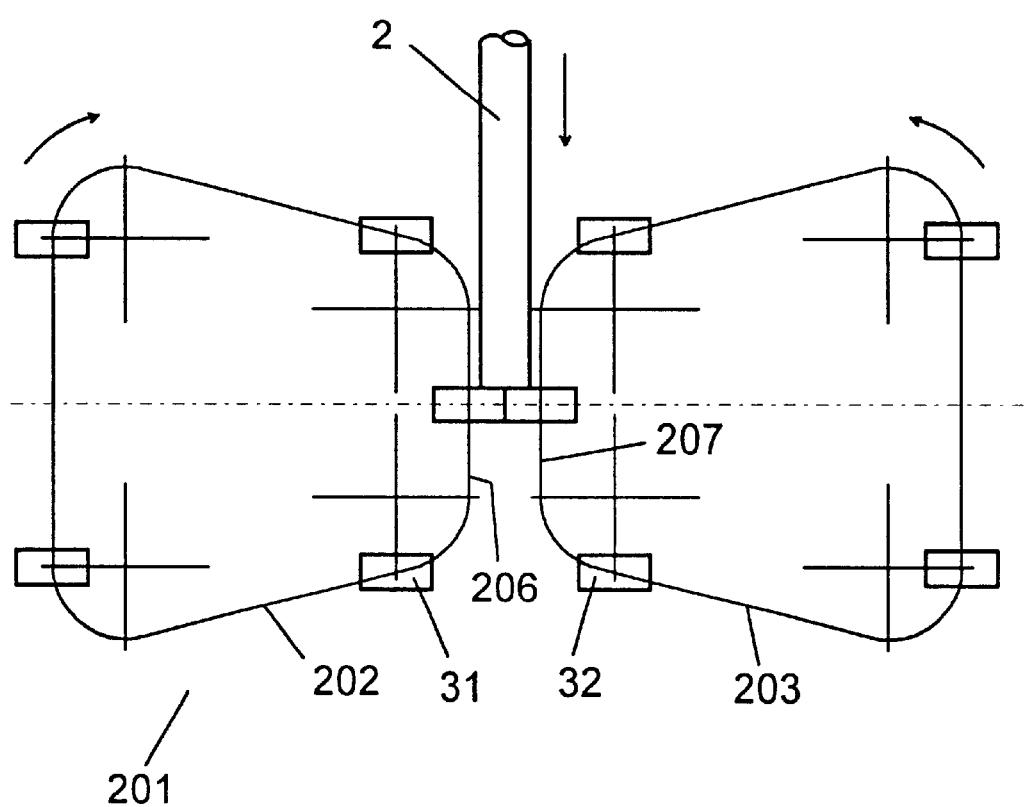
Figure 22:
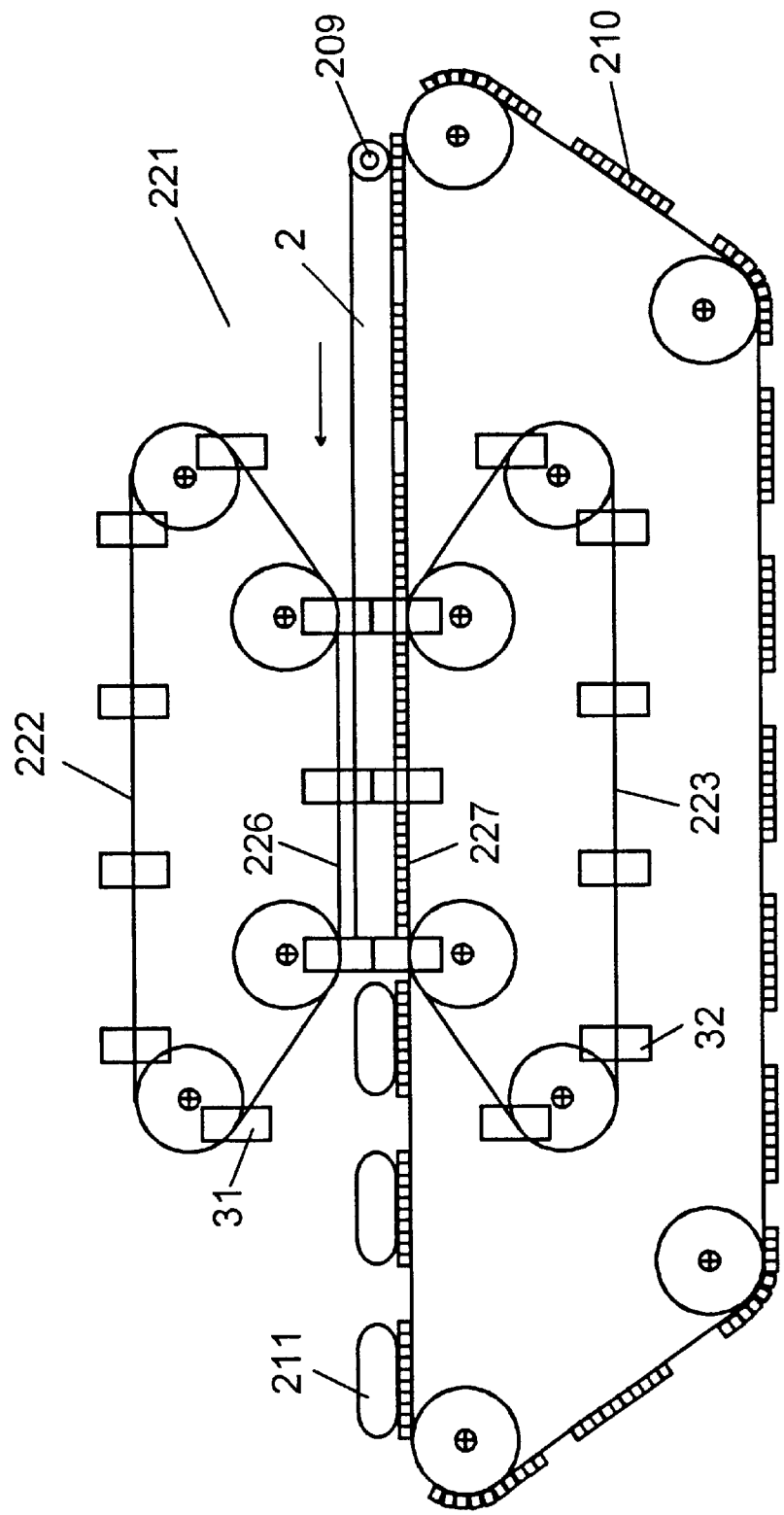
Figure 23:
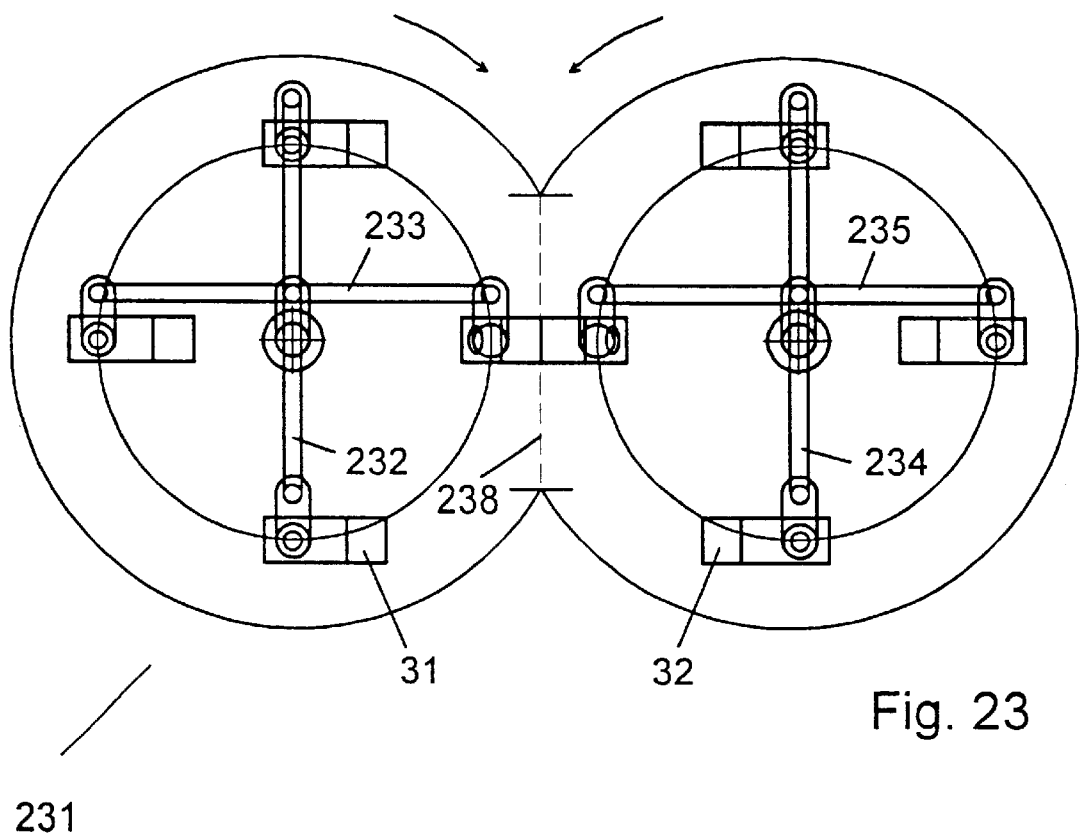
Figure 24:
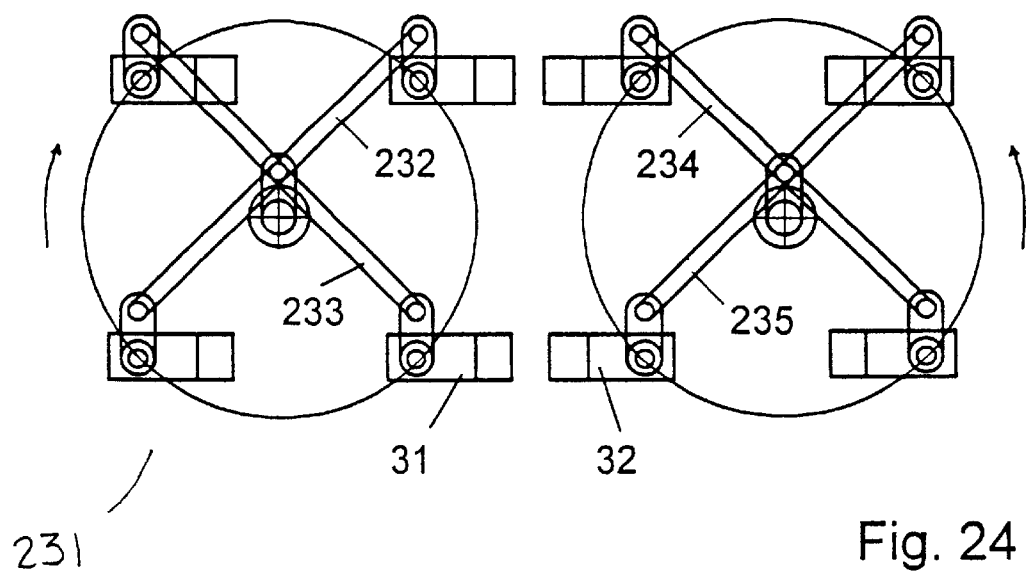

FIGS. 1 to 9 show an apparatus for the formation and severance of a strip of plastic material with its tools in nine different positions, FIG. 10 shows a tool in its open position, FIG. 11 shows a tool in its closed position and different actuating element for the tool segments, FIG. 12 shows the tool again, after its halves have been moved apart, FIG. 13 to 20 shows different positions of the timed moving operation of the two tool parts and their drive units, FIG. 21 shows a diagrammatic view of an apparatus with tool parts connected to two chains, where the tool parts rest next to each other in the vertical section of the chains, FIG. 22 shows also a diagrammatic view of an apparatus with a horizontal section in which the tool parts rest next to each other as well as a conveyor for the strip of dough, FIG. 23 shows another diagrammatic view of an apparatus with two crossing lever arms, to the end of which tool parts are connected and which, to a large extent, move on a circular orbit, and FIG. 24 shows the apparatus as in FIG. 23 in a position after the lever arms and the tool parts have been rotated further.

Figure 2:
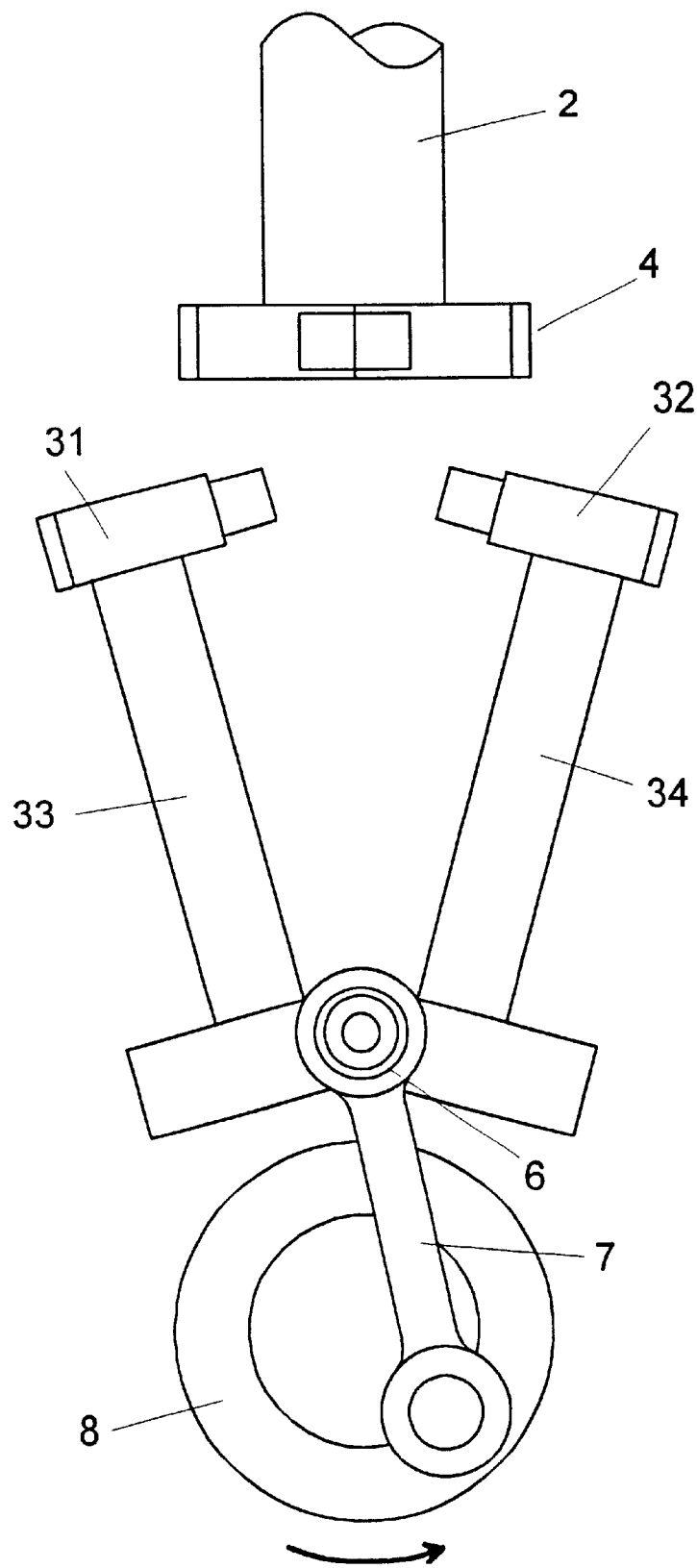
Figure 3:
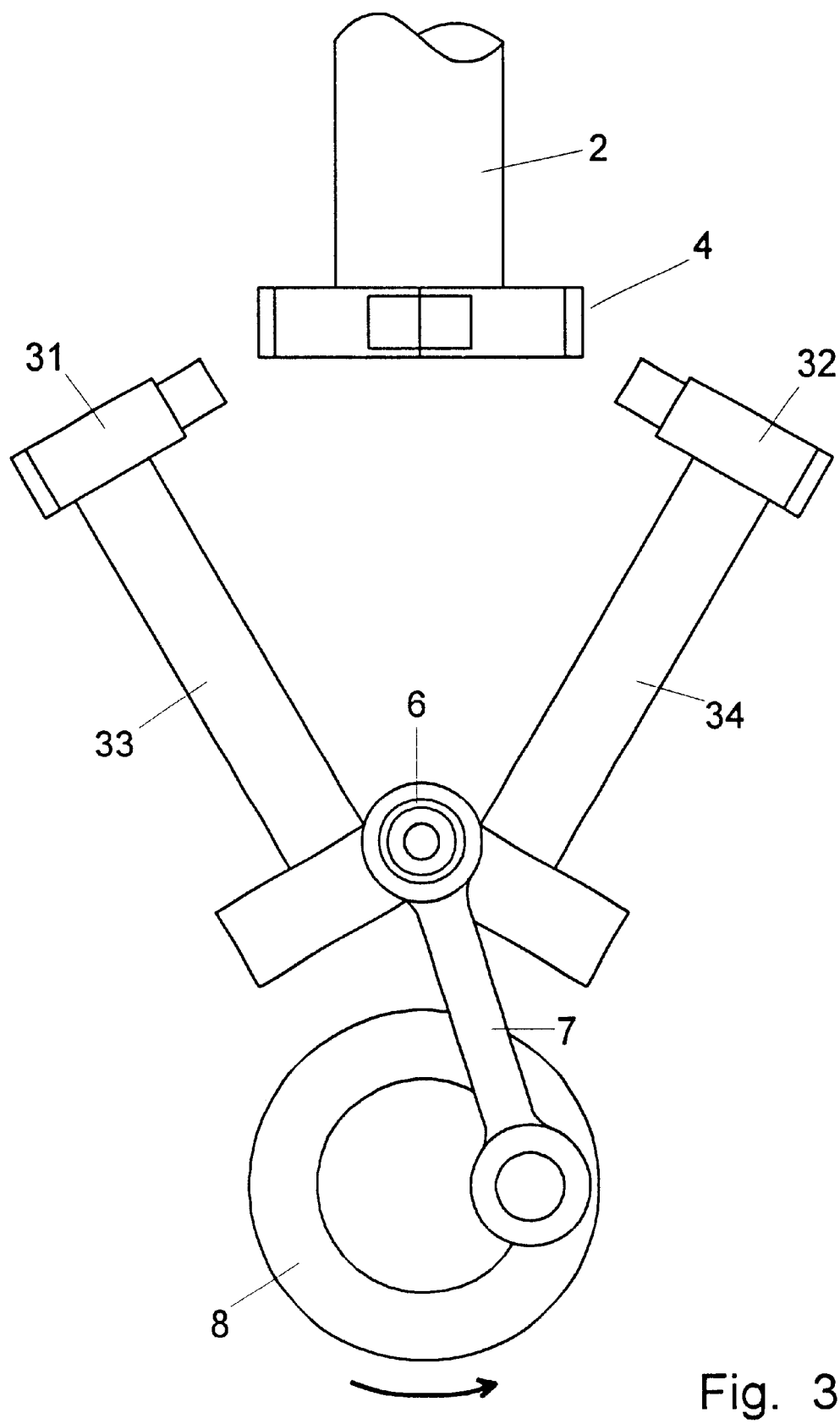
Figure 4:
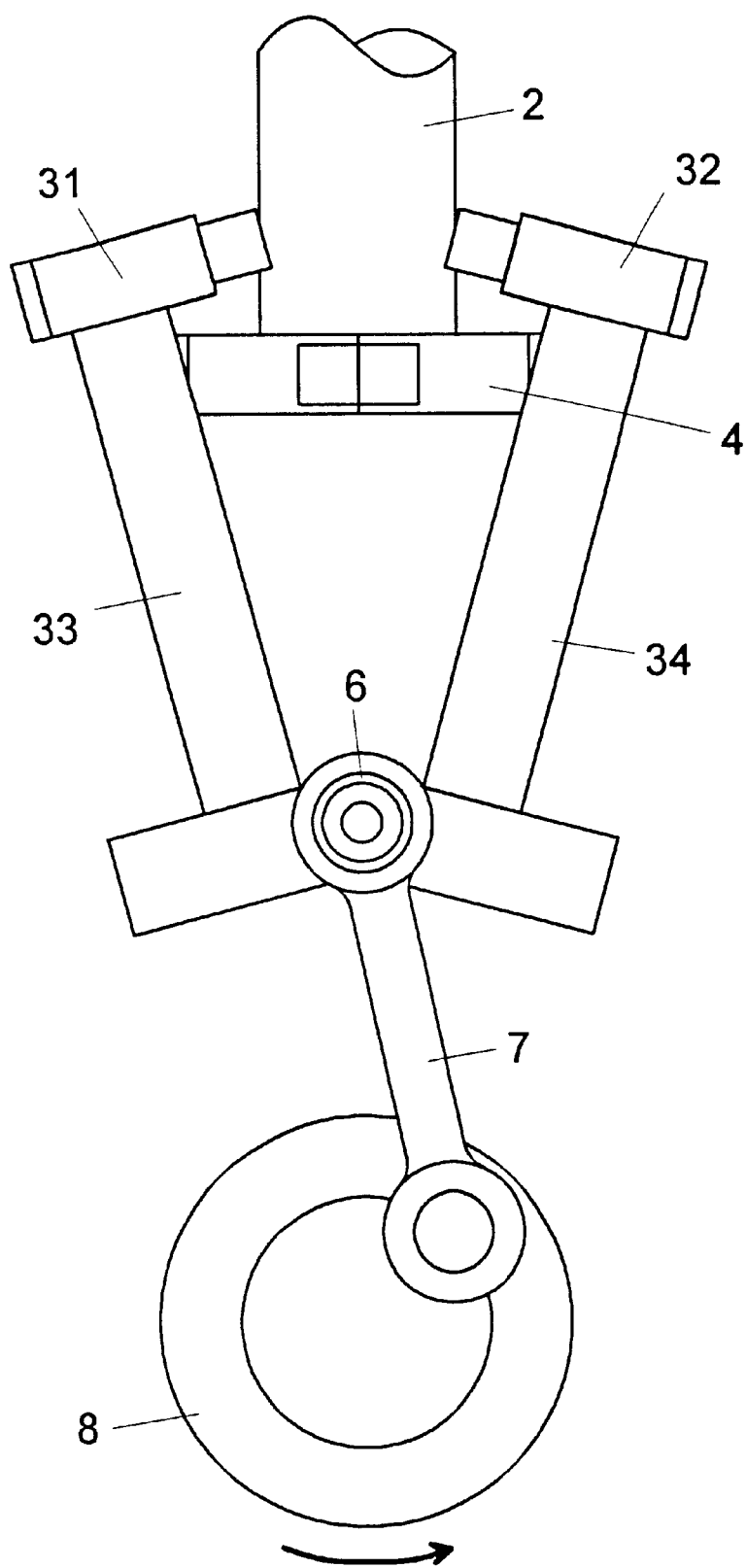
Figure 5:
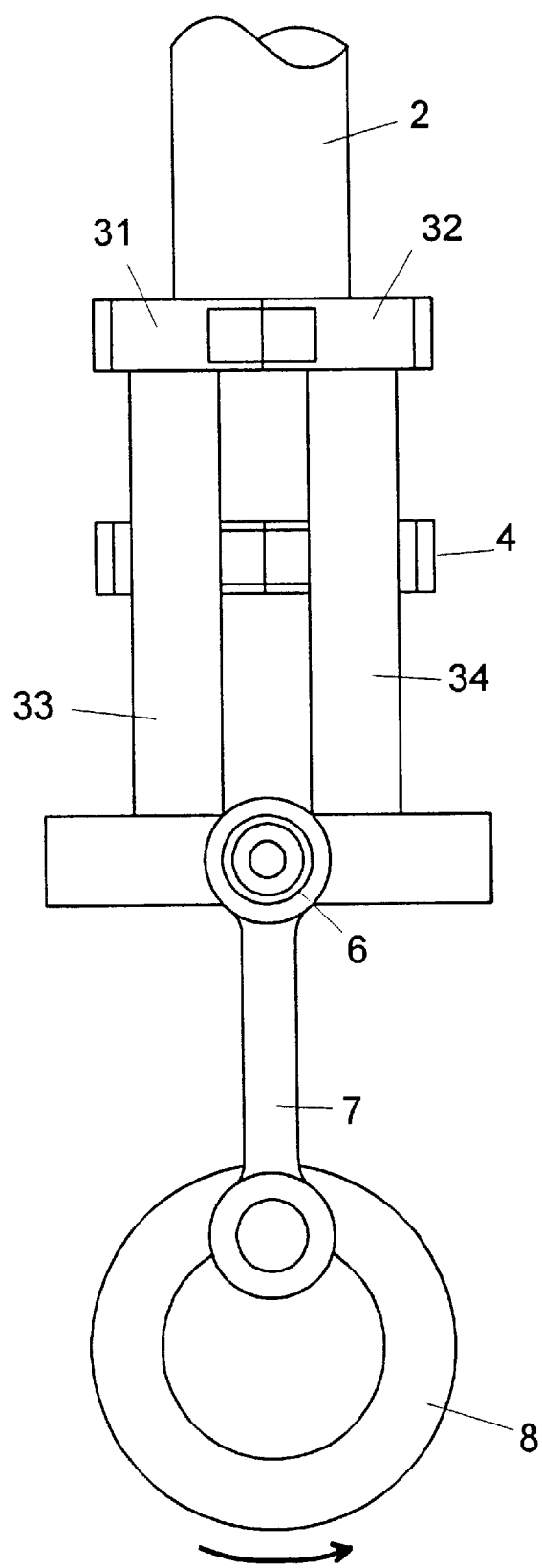
Figure 6:
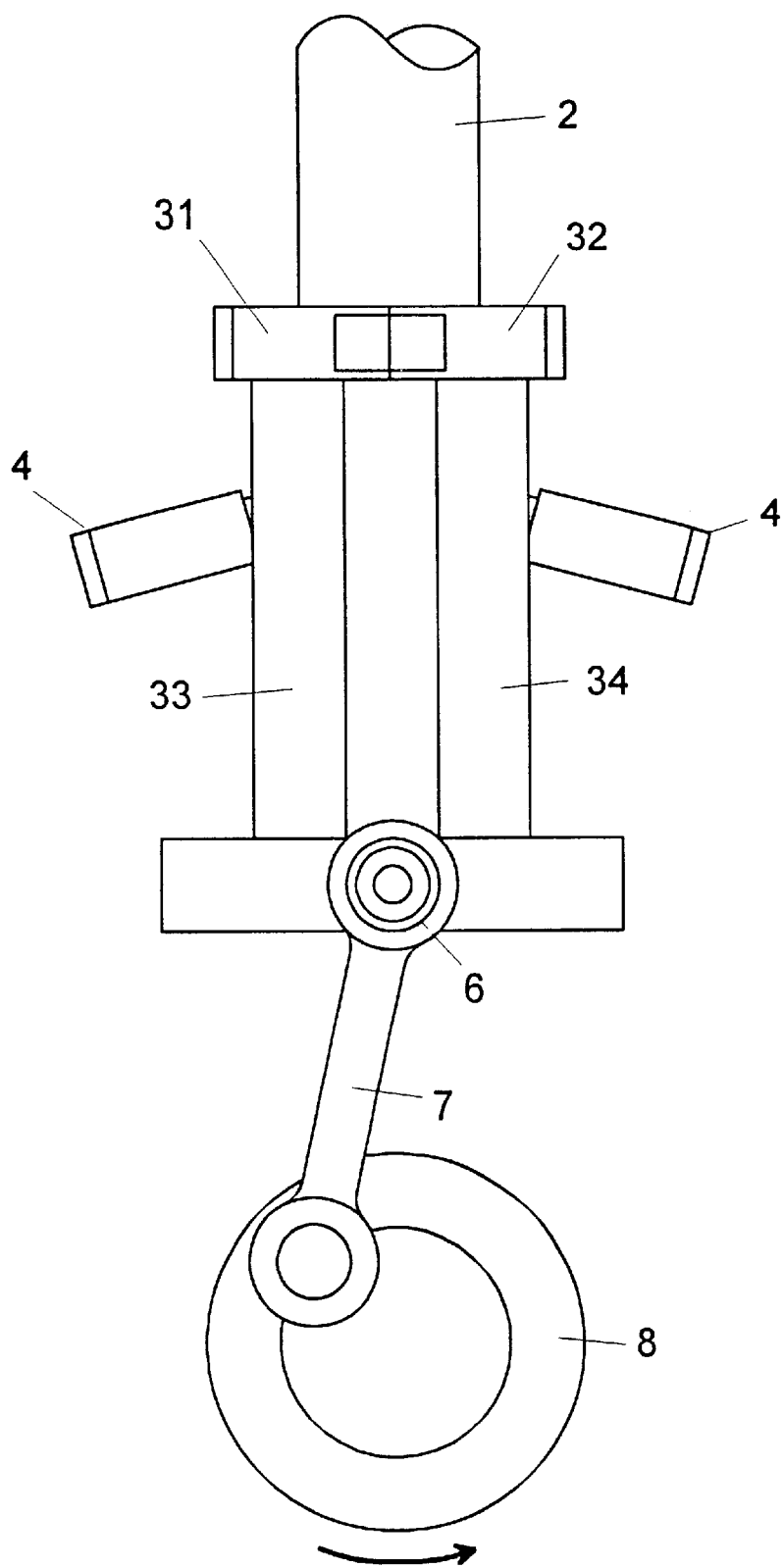
Figure 7:
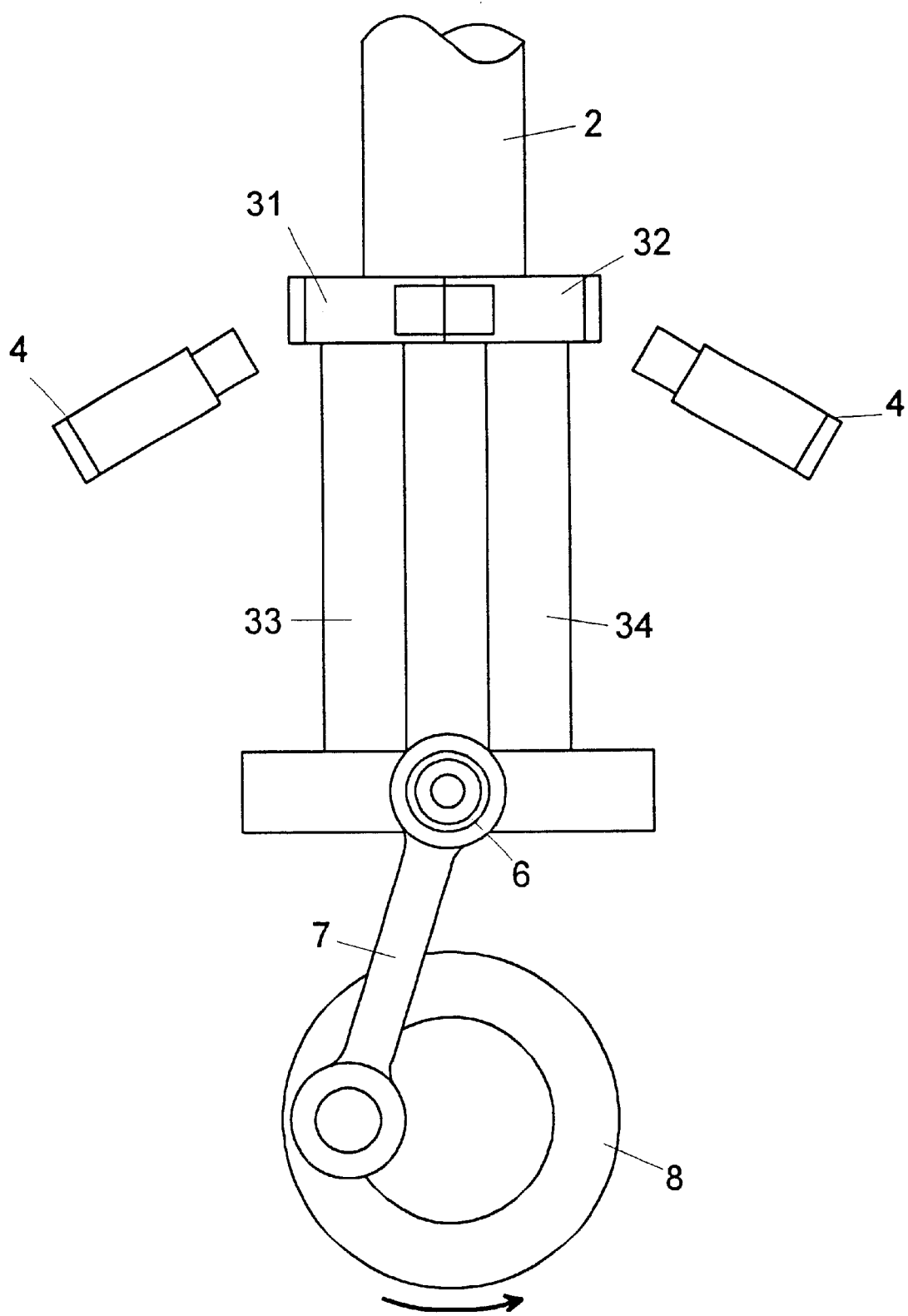
Figure 8:
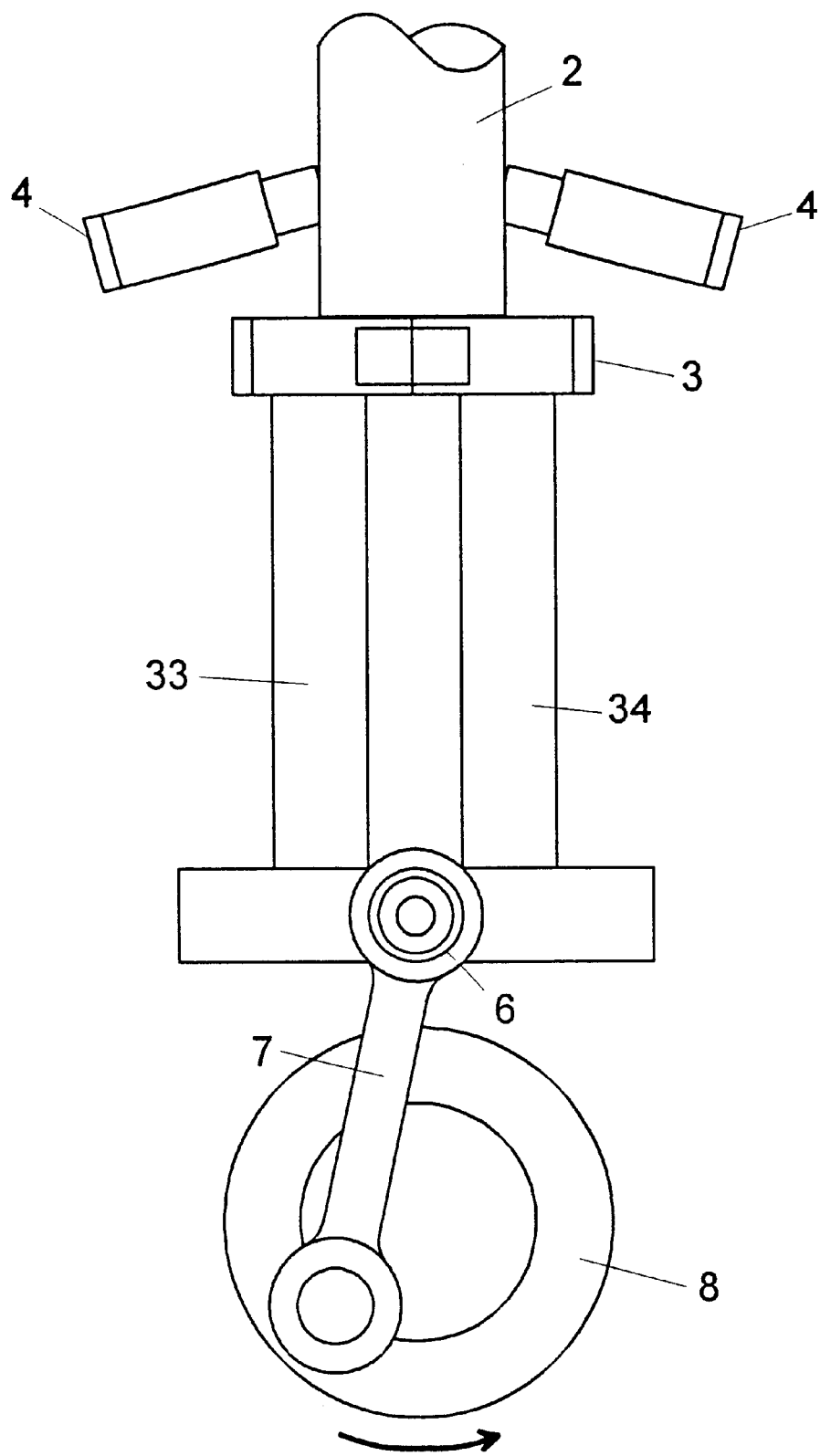
Figure 9:
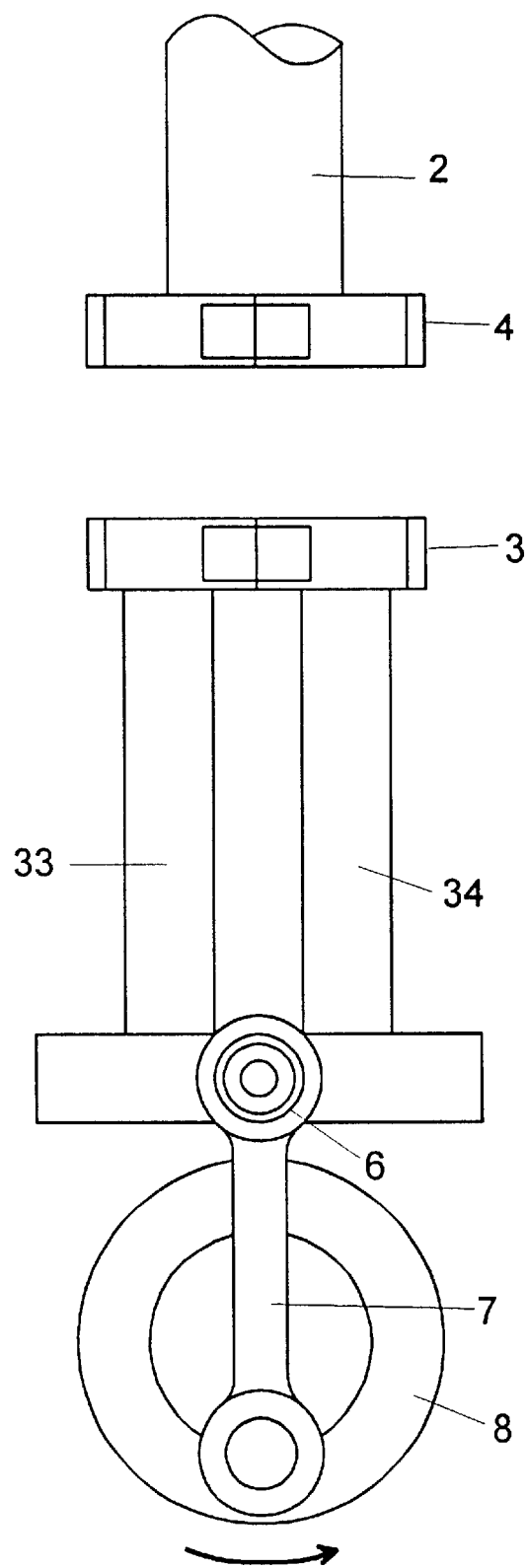

DESCRIPTION OF THE PREFERRED EMBODIMENTS 1 in FIG. 1 is an apparatus for the constriction and possible severance of a strip 2 of plastic material such as dough, the severed section of which is not shown in the drawing, as well as for the possible simultaneous closure of a casing. The apparatus 1 consists essentially of two dividable tools 3 and 4, both of which are provided with a drive unit, although only the drive unit 5 of the tool 3 is shown in the drawing. The two halves 31 and 32 of the tool 3 are each located at the top end of a hollow support column 33 and 34, which are pivoted at their bottom end on the top bearing 6 of the connecting rod 7 of a crank drive 8. The tool 3 is shown closed and in its bottom end position, while the second tool 4 is also shown closed but in its top end position. When the crank drive 8 is turned in the direction of the arrow, the connecting rod 7 moves the tool 3 upwards. The two halves of the tool 31 and 32 are at the same time moved apart by a lever connection that is not shown in the drawing. Instead of this lever connection, it is also possible to provide a gear mechanism, by means of which the two support columns 33 and 34 are connected, so that the tool is opened at the same time that it is moved upwards. FIG. 2 shows an intermediate stage in the opening movement, while the tool is shown completely open in FIG. 3. FIG. 4 shows a further intermediate stage that is reached when the tool 3 continues ist upper movement. The tool 3 is also closed when the crank drive 8 reaches its upper dead centre, as shown in FIG. 5. As can be seen in FIGS. 6 to 9, the tool 3 is moved downwards in this closed state, in order in the course of this movement to form a section of the strip 2 or—according to the design of the tool—to constrict or sever it, The tool 4 is in its top and also closed position in FIG. 1, in which the tool 3 is in its bottom and closed position. The tool 4 is then moved downwards in this closed state as shown in FIGS. 2 to 5 until it reaches ist bottom position in FIG. 5. Since they are in different positions (opened and closed), the tools 3 and 4 have no trouble in moving past each other when they are travelling in opposite directions in this way.

During the downward movement of the tool 3 that is taking place between the positions shown in FIGS. 5 to 9, the tool 4 is opened and at the same time moved upwards, with no mutual obstruction of the tools in this case either.

Although the upward and downward movements and the closing and opening movements are linked, the timing can be varied, so that it is possible to adapt the closing and opening movement to the individual requirements of the strip of material being processed. For some applications it is even possible to move both of the tools in the same direction at the same time.

As is shown in the case of one tool in FIG. 10, both the tools 3 and 4 consist of six trapezoidal segments 35, 36, 37, 38, 39, 40, Free of which are allocated to each of the tool halves 31, 32. A hexagonal housing that is devided along a central line is provided to hold the segments. These segments support each other with one of their surfaces, while the two free surfaces rest against the housing. As soon as one of these segments is moved, this movement is automatically transmitted to the other segments as well.

A push and pull rod 41/42, which is connected to the crank/bolt drive 43/44 at the opposite end from the segments, engages two segments 35 and 38. A crank wheel 47, 48, which in torn is provided with a bolt 49, 50, is located on a drive shaft 45/46. This bolt 49/50 engages an oblong opening 51/52 in the push and pull rod 41/42. The rod is given lateral guidance in relation to the drive shaft 45/46 via a further oblong opening 53/54. The two segments 35 and 38 that are connected to the respective push and pull rods 41 and 42 are both positioned on one part of the outside of the respective tool half 31 and 32; the two segments 37 and 40 positioned on the other part of the outside of the tool halves are connected to a pulling device 55/56, which extends parallel to the adjacent side wall of the housing and returns the respective segment 37, 40 to the open position illustrated in FIG. 10. This also makes sure the segment is held in place when the tool is open.

FIG. 11 shows the same tool as in FIG. 10 after the segments have been moved together, where the tool part shown on the right side is provided with a toothed belt 61 as actuating element which is driven by the crank wheel 47 and drives segment 35 through a peg 62. One end of the pulling device 55 is connected to this peg 62.

Figure 12:
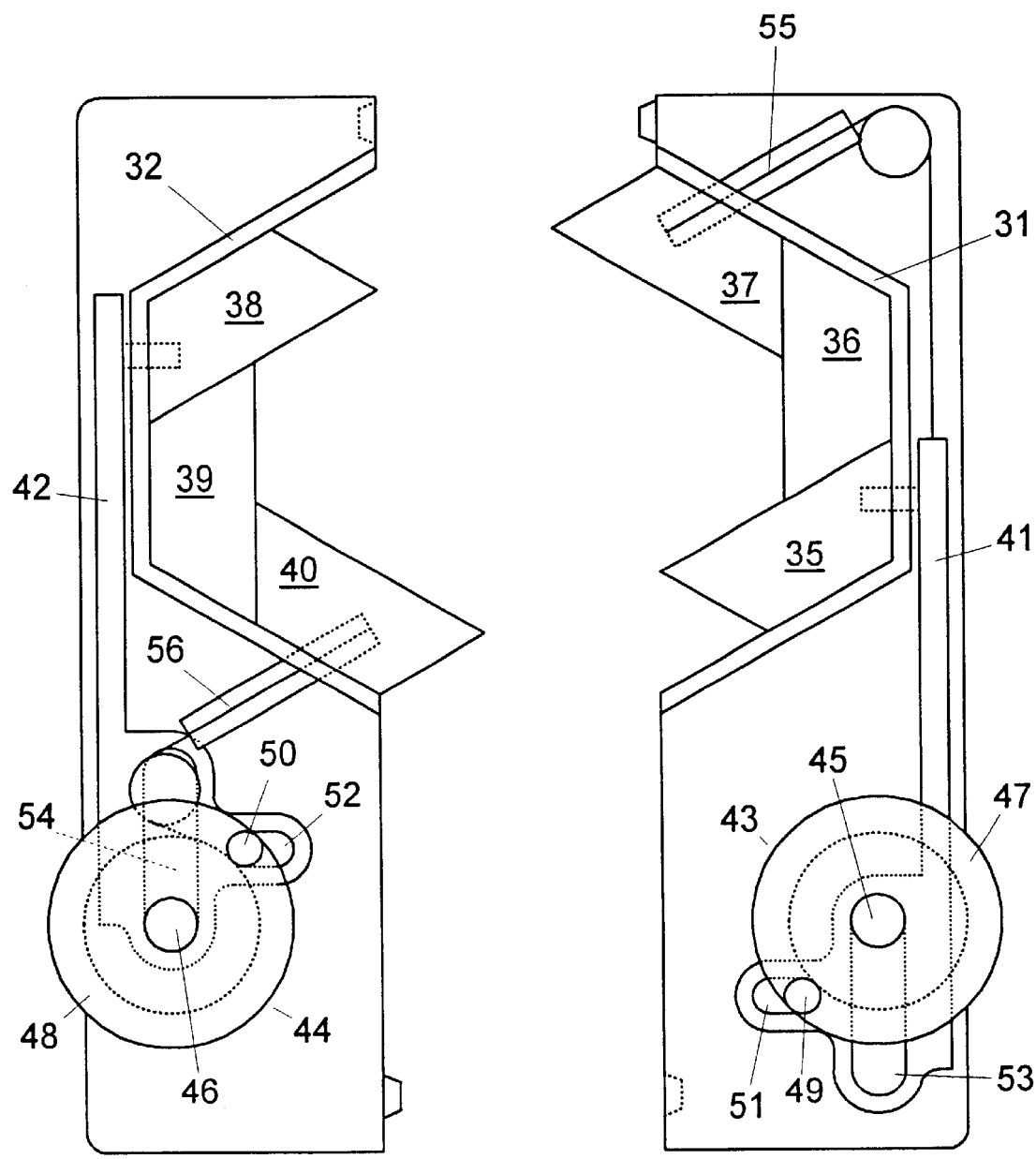
Figure 14:
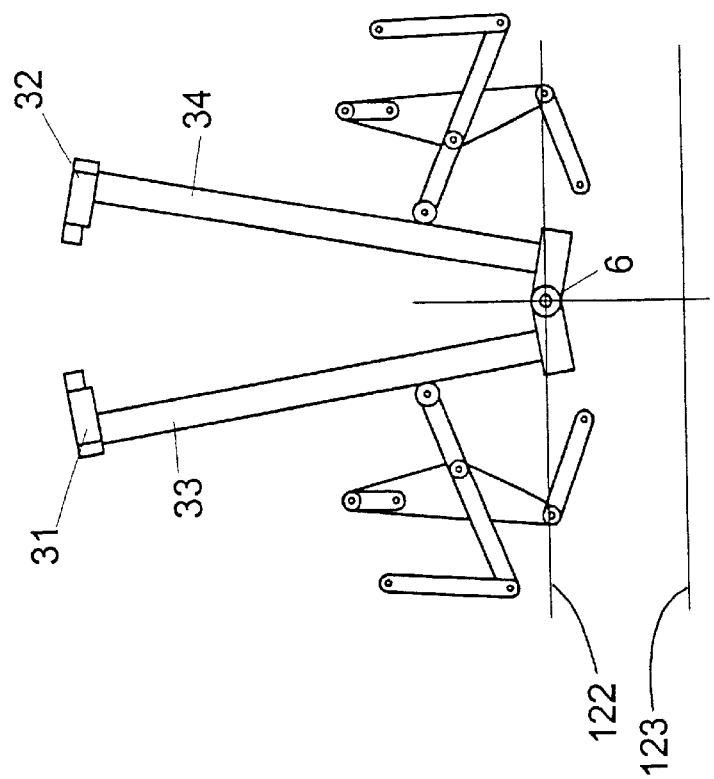

FIG. 12 shows a tool in its opened position, i. e. with the tool halves moved apart, where the segments are also in their open position.

When dividing a rope of material into individual segments which are not separated from each other, it is expedient, if in the area of the tools an appartus for the application of clips is provided to fix the subdivisions.

However, it is also possible to arrange two parallel clamps and subsequently to sever the rope of material between these two clips.

FIGS. 13 to 20 shows in detail an apparatus with the help of which the opening and the closing of the tools can be achieved. The halves of the tool 31 and 32 are placed on the end of lever arms 33 and 34, theother ends of which are attached to a joint pivot bearing 6. This pivot bearing 6 can be moved in longitudinal direction along a line 107. Both lever arms 33 and 34 are engaged by a first arm 108 of a knee lever who is pivoted there in bearing 109. This bearing 109 can be arranged on lever arm 33, 34 to be ad-justed in longitudinal direction—not shown in the drawing. Through a toggle joint 110 a first arm 108 is connected to a second arm 111 whose end opposing the toggle joint is connected to a stationary pivot 112. This stationary pivot 112 can be designed in an adjustable way to modify the movement operation. Between the bearing 109 and the toggle joint 110, the first pivot bearing 113 of a two-armed lever 114 engages, whose second pivot bearing 115 is connected to a lever arm 116 that in return is pivoted on a stationary bearing 117. This stationary bearing 117 can also be arranged in a moveable way. On the third pivot bearing 118 of the two-armed lever 114, lever arm 119 engages, whose other end is connected to a rotating drive unit 120 not shown in detail in the drawing.

Figure 13:
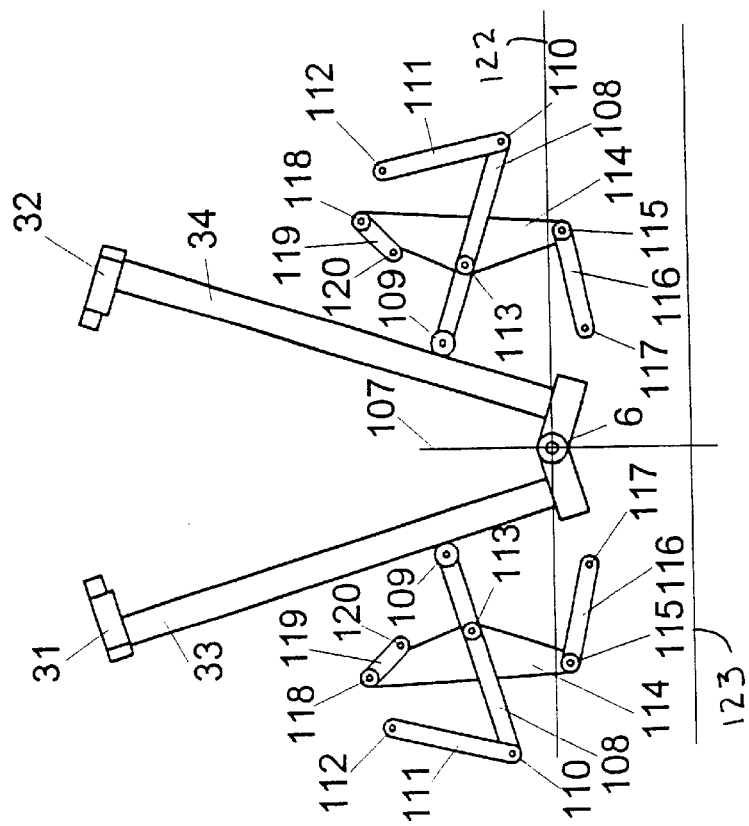
Figure 18:
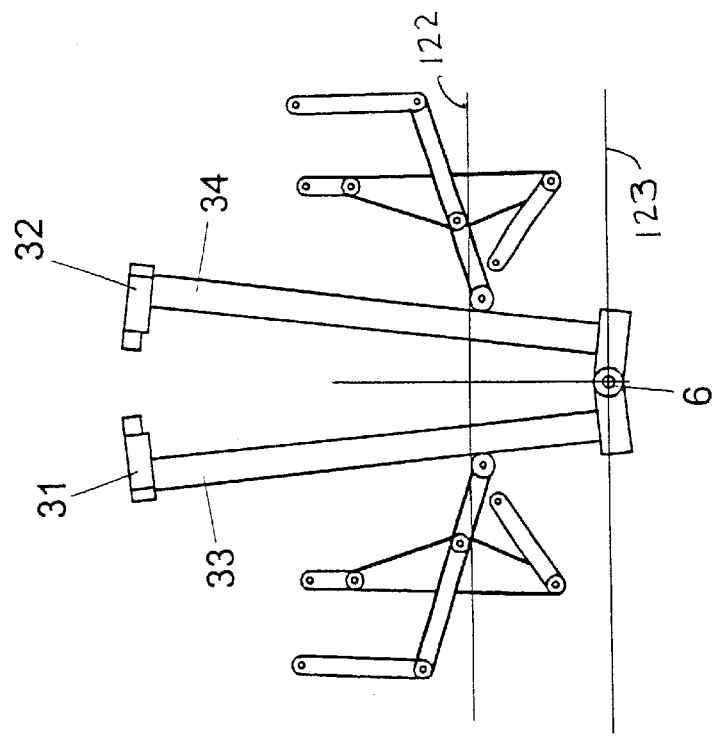
Figure 17:
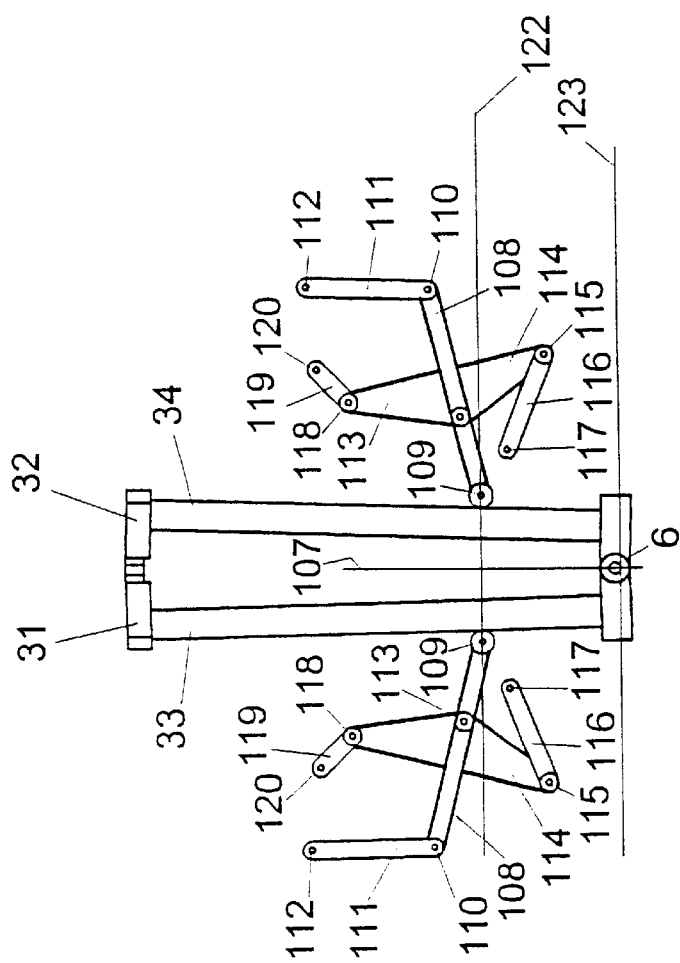
Figure 20:
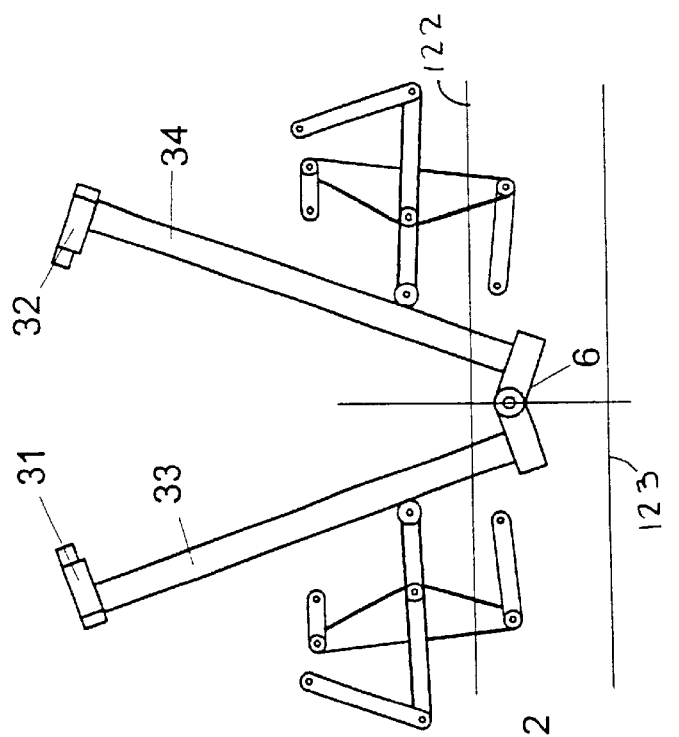
Figure 19:
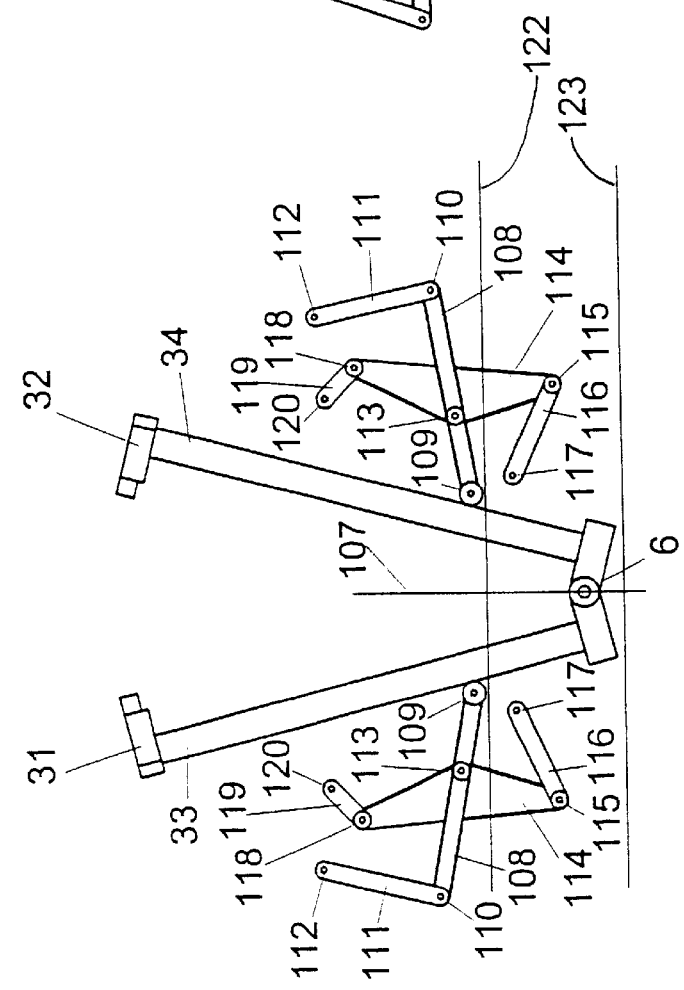

FIG. 13 shows both tools 31 and 32 in an upper moved apart position. When the rotating drive unit 120 is turned clockwise, lever arm 119 reaches the position shown in FIG. 14. This way, through the two-armed lever 114 and the arm 108 of the knee lever, the arm 33 respectively 34 swings to the inside and touches the strip 2 to be formed. As artifical line 112 reveals, the pivot bearing 6 remains in its height position. When the rotating drive unit 120 is turned further into the position shown in FIG. 15, both tools are moved further towards each other and, at the same, moved downwards—thus following the downward movement of the strip.

FIG. 16 shows both tools in ist most closed position in which the optimal forming of the strip is achieved. When the rotating drive unit 120 is turned further into the position shown in FIG. 17, both halves of the tool already move apart again while they still move downwards. This is revealed in particular by the second artifical line 123. Only in the position the rotating drive unit 120 reaches in FIG. 18, the tools have reached their lowest position where they already—to a large extent—away from the strip. When the rotating drive unit 120 is turned further into the position shown in FIG. 19, the end position for the most opened position of both tools 31 and 32 (shown in FIG. 20) is reached Both halves of the tool move up again, as revealed by the position of the pivot bearing 6 in relation to the two articifical lines 122 and 123. When the two tools (from FIG. 20 to FIG. 13) continue their upper movement, a slight closing of the tools takes place at the same time.

The course of the movement curve of both halves of the tool can be modified by relocating the bearings 109, 112 or 117, thus allowing an adaption to different feeding rates of the strip and to the desired closing travels.

In FIG. 21, an apparatus is marked with 201 which has two chains 202 and 203—not shown in detail in the drawing—to each of which several tool parts 31 respectively 31 are attached. Both chains 202, 203 have a section in which they run parallel to each other and with a small distance from each other. In addition, the distance is adjusted in a way that the corresponding tool parts touch each other and the strip of dough 2 that is released in vertical direction from an extruder above—not shown in the drawing—, and that the strip of dough 2 is enclosed, formed respectively subdivided between the corresponding tool parts. For this purpose, the inside of the tool parts are provided with segments that can be moved against each other and that can be moved together more or less closely. To control these segments, each one of the two sections 206 and 207 is provided with a gatelike program device that is not shown in the drawing.

Each one of the two chains 202 and 203 is connected to a drive that is not shown in the drawing either, and that can drive both chains and thus the tool parts within an orbit at an intermitting speed.

For the embodiment in FIG. 22, an apparatus 221 is provided that also has two chains 222 and 223. In this case too, two parallel sections 226 and 227 of the chains are provided, that are, however, arranged in horizontal direction and in which the tool parts 31 and 32 rest closely next to each other. This way, the strip of dough 2 that is released from a lateral extruder die 209 onto a conveyor belt 210 is enclosed between them. The tool parts in section 226 and 227 subdivide the strip of dough 2 and pinch both ends of the resulting individual pieces 211. Also in this case, a forming of the strip of dough is possible and can be achieved with the segments described before. The conveyor belt 210 is provided with gaps into which the tool parts are able to grip—where the conveyor belt segments resulting thereof have about the same lenght as the individual pieces—and are able to carry them away. It is possible to modify the conveyor belt segments and the length of the individual pieces 211 at the same time; this only requires a change in the position of the tool parts 31 and 32 on the chains 222 and 223.

In the embodiment shown in FIGS. 23 and 24, an apparatus 231 is provided with two two-armed lever arms 232, 233 respectively 234, 235 with their respective ends connected to tool part 31 respectively 32. The tool parts of each one of both sides are moved along circular orbits which overlap in a middle area When entering the overlapping area of the circular orbit, the tool parts 31, 32 meet each other and then move along a straight fine 238, This is possible since the tool parts are connected to flexible bearings.

In addition, the tool parts are spring-loaded—not shown in the drawing—through which they can rest reliably next to each other.

FIG. 24 shows the apparatus 231 with its tool parts in an intermediate position.

In addition to the shown drive units, it is possible to provide all embodiments with guiding devices for the tool parts which can be of particularl advantage for high speed transport

What is claimed is:

1. An apparatus for processing, constriction and severance of a strip of plastic material at specified longitudinal intervals, and for simultaneous closure of a casing, comprising a tool having two tool parts, each of the tool parts consisting of a plurality of segments that are movable against each other, wherein at least one of the tool parts consists of two sections that are separable from each other between closed and open positions and each of the two sections contains some of the segments and where one of said two tool parts is located above the other of said two tool parts in said closed position, and wherein in said open position, said other of the tool parts is located above said one of the tool parts and further comprising a polygonal housing for the sections, and wherein said plurality of segments rest against each other with at least one of segments' surfaces while a further surface is supported against sliding surfaces of said polygonal housing, and further comprising an actuating element that engages at least one of said plurality of segments and moves said at least one of the plurality of segments directly and the other segments indirectly into said closed position and said open position to server the strip of plastic material.

2. The apparatus according to claim 1, wherein a speed of the tool parts with respect to each other is coordinated with a speed at which the strip is transported.

3. The apparatus according to claim 1, wherein a tool movement speed and distance and a tool closing and opening speed are co-ordinated with each other in a movement from a top point to a bottom point.

4. The apparatus according to claim 3, wherein said at least one of said two tool parts of the tool is separated into said two sections between two end points of a traveling path when said tool parts move from the bottom point to the top point.

5. The apparatus according to claim 1, wherein the tool is opened when the tool is moved from a bottom position to a top position.

6. The apparatus according to claim 1, wherein a further actuating element engages another one of said plurality of segments of the tool and moves said another one of said plurality of segments and thus indirectly moves the other segments into the open position.

7. The apparatus according to claim 1, wherein said housing is a two-part housing having two halves, each of the two halves of the housing encompassing said at least one of said plurality of segments, wherein said actuating element engages said at least one of said plurality of segments in each of the two halves of the housing and moves the segments into the respective closed and open positions.

8. The apparatus according to claim 7, further comprising a further actuating element that engages said at least one of said plurality of segments in each of the two halves of the housing and moves said at least one of said plurality of segments and thus indirectly moves the other of said plurality of segments into the open position.

9. The apparatus according to claim 7, wherein the two halves of the housing of the tool are attached to move support columns that are hollow and provided inside with a drive unit for adjusting the plurality of segments.

10. The apparatus according to claim 9, further comprising a gatelike program device incorporated in the drive unit for moving the plurality of segments, said program device carrying out a closing and opening movement of the plurality of segments in accordance with a lifting movement of the tool.

11. The apparatus according to claim 10, wherein the drive unit has an eccentric design.

12. The apparatus according to claim 1, wherein a toothed belt is used as the actuating element.

13. The apparatus according to claim 1, further comprising a device for application of closure elements for the strip, said device disposed adjacent the tool.

14. The apparatus according to claim 13, wherein a cutting device severs the strip between the applied closure elements.

15. The apparatus according to claim 1, wherein the tool is located on a lever arm that is connected to a pivot bearing having an end opposing the tool, wherein the pivot bearing allows a longitudinal displacement and wherein the lever arm is engaged by a drive unit which turns the lever arm around the pivot bearing and moves the pivot bearing in longitudinal direction.

16. The apparatus according to claim 15, wherein the lever arm is engaged by a knee lever having a first arm that is pivoted on said lever arm with one end and connected to a second arm with an other end and wherein an opposing end of the second arm is connected to a stationary pivot, where the drive unit for the lever arm engages through the knee lever.

17. The apparatus according to claim 16, wherein a two-armed lever is connected via a first pivot bearing to the first arm of the knee lever and has a second pivot bearing that is stationary pivoted and a third pivot bearing that is driven in a circular orbit.

18. The apparatus according to claim 17, wherein an additional lever arm is pivoted on the second pivot bearing, and wherein an end of said additional lever arm opposing the second pivot bearing is stationary pivoted.

19. The apparatus according to claim 17, wherein a further lever arm is connected to the third pivot bearing and wherein said further lever arm is connected to a stationary rotary drive with an end opposing the third pivot bearing.

20. The apparatus according to claim 17, wherein the first pivot bearing of the two-armed lever is provided between the second and third pivot bearings.

21. The apparatus according to claim 17, wherein an application point of the knee lever on the lever arm is designed to allow adjustments in the longitudinal direction.

22. The apparatus according to claim 16, wherein the stationary pivot is arranged adjustably.

23. The apparatus according to claim 16, wherein the knee lever is a perforated disc.

24. The apparatus according to claim 1, wherein said each of the tool parts is connected to lever arms and said each of the tool parts moves on a curved track, wherein the curved tracks of the two tool parts overlap along a contact route and wherein the tool parts are connected to flexible bearings and are in working position with the contact route.

25. The apparatus according to claim 1, wherein the tool parts are provided with a drive unit that works with intermitting speeds during circulation of the tool parts.

26. The apparatus according to claim 1, wherein a gatelike program device is provided at least within a working area of the tool parts to control the plurality of segments of the tool parts that are moved against each other.

27. The apparatus according to claim 1, wherein the two tool parts are connected to a flexible bearing and are spring-loaded.

* * * * *